United States Patent
Liotta

(10) Patent No.: US 12,118,637 B2
(45) Date of Patent: Oct. 15, 2024

(54) PASSENGER AND ITEM COORDINATED DELIVERY SYSTEM

(71) Applicant: Zoox, Inc., Foster City, CA (US)

(72) Inventor: Nicholas Liotta, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 475 days.

(21) Appl. No.: 17/358,351

(22) Filed: Jun. 25, 2021

(65) Prior Publication Data

US 2022/0414811 A1 Dec. 29, 2022

(51) Int. Cl.
| | |
|---|---|
| *G06Q 10/02* | (2012.01) |
| *G05D 1/00* | (2006.01) |
| *G06Q 10/0631* | (2023.01) |
| *G06Q 50/30* | (2012.01) |
| *G06Q 50/40* | (2024.01) |
| *B60P 3/00* | (2006.01) |
| *B60W 60/00* | (2020.01) |
| *G06Q 10/0835* | (2023.01) |

(52) U.S. Cl.
CPC ........... *G06Q 50/40* (2024.01); *G05D 1/0217* (2013.01); *G05D 1/0287* (2013.01); *G06Q 10/06315* (2013.01); *B60P 3/007* (2013.01); *B60W 60/00253* (2020.02); *B60W 60/00256* (2020.02); *G06Q 10/08355* (2013.01)

(58) Field of Classification Search
CPC ............................... G06Q 10/02; G06Q 50/30
USPC ........................................................ 705/7.25
See application file for complete search history.

(56) References Cited

U.S. PATENT DOCUMENTS

| | | | |
|---|---|---|---|
| 2017/0132934 A1* | 5/2017 | Kentley | ................. G08G 1/202 |
| 2017/0213308 A1 | 7/2017 | Wellborn et al. | |
| 2018/0350024 A1 | 12/2018 | Kaufman | |
| 2019/0317526 A1* | 10/2019 | Goldman | ............... G06Q 10/02 |
| 2020/0051194 A1 | 2/2020 | Park et al. | |
| 2020/0192363 A1* | 6/2020 | Landy | ................. G05D 1/0291 |
| 2020/0193368 A1 | 6/2020 | Bhatia et al. | |
| 2020/0394746 A1* | 12/2020 | Krishnamurthy | .... G06Q 10/083 |
| 2021/0142248 A1* | 5/2021 | Balva | ..................... G08G 1/202 |

(Continued)

OTHER PUBLICATIONS

PCT Search Report and Written Opinion mailed Oct. 20, 2022 for PCT application No. PCT/US2022/034372, 13 pages.

*Primary Examiner* — Nga B Nguyen

(74) *Attorney, Agent, or Firm* — Lee & Hayes, P.C.

(57) ABSTRACT

A transportation system controls a fleet of autonomous vehicles to implement passenger transportation and coordinate delivery of baggage or other associated items using separate vehicles. The transportation system receives passenger data and associated item data via a user interface, and determines the number and type of autonomous vehicles to transport the passengers and items from selected pick-up locations to a destination. In various implementations, the transportation system may support different pick-up locations, pick-up times and/or delivery times for the passengers and associated items. The transportation system also may determine delayed item delivery options for different delivery times and modes of transportation. Based on the passenger and item data, along with input received via the user interface, the transportation system determines the vehicles to deploy and the delivery routes, and transmits instructions to the autonomous vehicles to provide the passenger transportation and perform the item delivery.

20 Claims, 8 Drawing Sheets

(56) References Cited

U.S. PATENT DOCUMENTS

2021/0155221 A1\* 5/2021 Gottehrer .............. B60W 20/40
2021/0166192 A1   6/2021 Balva
2021/0172751 A1\* 6/2021 Balva ..................... G06F 3/0482
2022/0396293 A1\* 12/2022 Harrington ............ G06Q 10/02
2023/0089493 A1\* 3/2023 Banthia .................. G01C 21/34

\* cited by examiner

PASSENGER AND ITEM COORDINATED DELIVERY SYSTEM

BACKGROUND

Vehicle sharing and autonomous driving technologies allow users to address their transportation needs in a convenient and flexible manner, while also providing benefits such as reduced traffic congestion, reduced need for parking, less pollution, and less road wear. In order to respond to transportation requests, and to transport large numbers of users to various destination locations in a timely manner, a vehicle-based transportation service may maintain a fleet of vehicles managed by a central system to schedule and book rides, determine routes, and monitor and maintain the vehicle fleet. However, vehicle sharing is not well equipped to handle certain situations, such as when passengers have large quantities of luggage or other equipment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
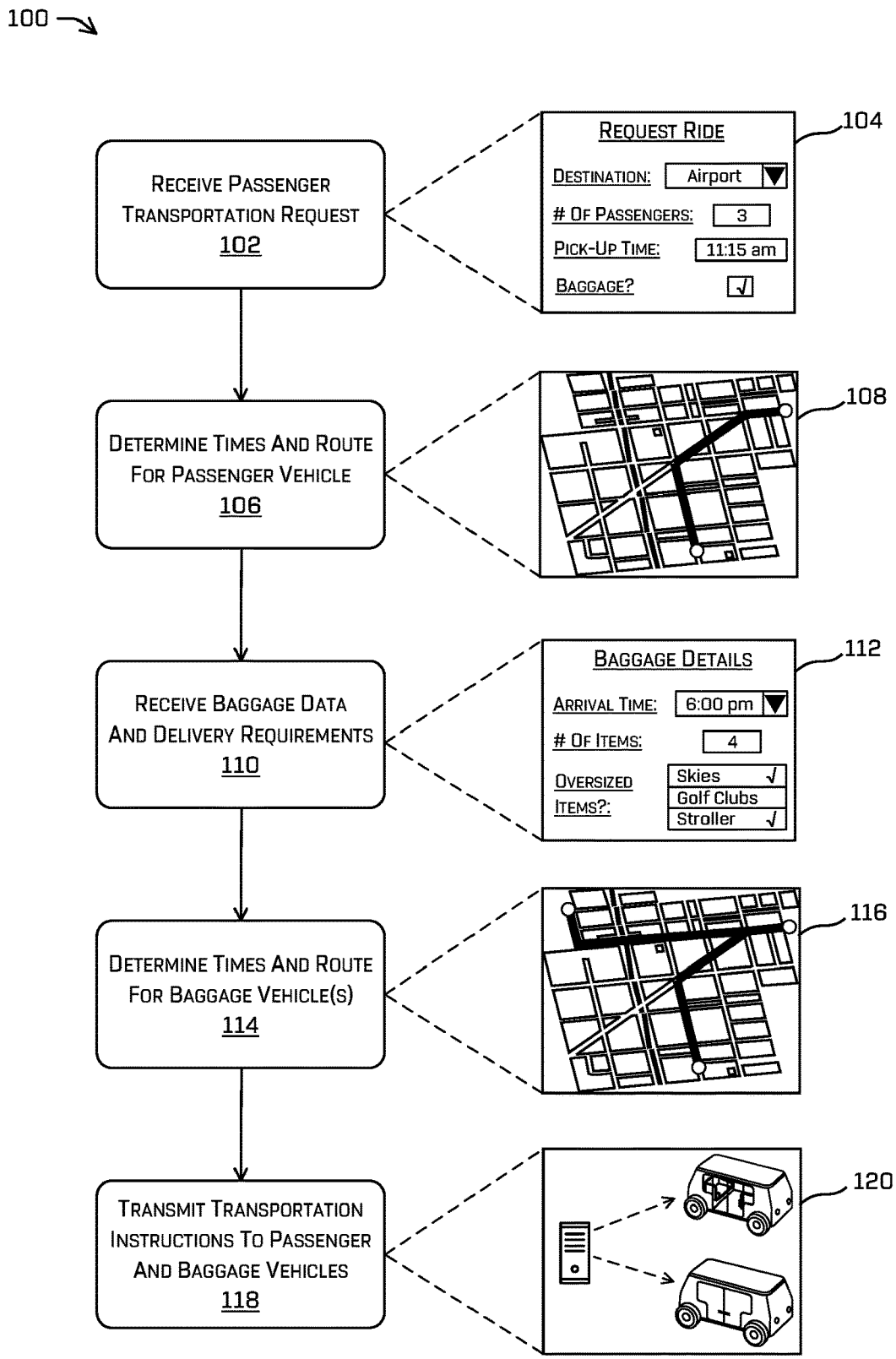
FIG. 1 illustrates an example process of performing a coordinated passenger trip and baggage delivery, in accordance with implementations of the disclosure.

The techniques discussed herein relate to providing and coordinating transportation for users and their baggage or other associated items in separate autonomous vehicles. In some examples, a transportation system that coordinates and controls a fleet of autonomous vehicles may receive transportation requests from users via user devices. The transportation system may provide a user interface to receive passenger data and associated item data from the user via the user interface. The passenger data and baggage item data may include, for example, the numbers of passengers and/or baggage items, item sizes, types, weights, and/or other characteristics associated with passengers or items to be delivered. Based on the passenger data and associated item data received from the user device, the transportation system may determine a number of autonomous vehicles and may select the types of vehicles for transporting the passengers and their baggage (or other associated items) in a coordinated delivery. The transportation system may use different vehicles types, including autonomous passenger vehicles for transporting passengers and autonomous cargo vehicles for delivering baggage, and may select different vehicle models, sizes, and/or characteristics based on the specific passenger data and item data (e.g., oversized items).

The transportation system may select one or more separate vehicles and determine routes for delivering the baggage items associated with a passenger trip, so that passengers and baggage may be transported on separate vehicles and may have separate itineraries including car, truck, rail, watercraft, and aircraft travel. Baggage itineraries may be generated and coordinated by the transportation system, to provide the associated baggage items to a particular destination at a particular time based on the details of the passenger trip. The transportation system also may support early baggage item pick-up and/or delayed baggage item delivery in some cases, and may determine different delivery options having different transportation costs. For instance, the transportation system may determine and present a number of different delivery options via the user interface, including different pick-up and delivery times, locations, and/or transportation modes, along with corresponding costs for each item delivery option. After selecting the passenger and baggage vehicles and determining the delivery routes, the transportation system may transmit instructions to the vehicles to perform the determined passenger transport and item deliveries. The transportation system also may track and monitor the passenger and baggage vehicles on-route to coordinate deliveries, provide user notifications, and modify delivery itineraries in response to delays or schedule changes.

As illustrated by the descriptions and various examples discussed herein, these techniques provide improvements and technical advantages for providing passenger transportation with coordinated delivery of baggage or other associated items in separate vehicles. In various examples, the techniques described herein may be used when an autonomous vehicle or another shared vehicle transporting a user may be unable to carry the user's luggage, recreational equipment (e.g., golf clubs, skis, surf boards, etc.), or other associated items that the user would like to be delivered to the same location. For example, certain items may be too large to transport in the same vehicle as the user, or the user may have too many passengers and/or too much baggage to fit into one vehicle. Issues such as these may be amplified when an autonomous vehicle is used to transport the individual (which may not have provisions for large items/baggage). Other types of items cannot be transported with the user in a passenger vehicle, or on a commercial flight with the user, for a various additional reasons based on the item's size, weight, material, transport costs, and/or safety considerations. Additionally, a user's baggage or other associated items might have a different pick-up location than the user, or might be available for pick-up at a different time, necessitating multiple stops or multiple trips to transport the user and the user's baggage.

The techniques described herein address these challenges by providing a single client application and/or single unified user interface for requesting and scheduling user transportation and deliveries of associated baggage items. This improvement reduces the number of applications required and simplifies the user interfaces that execute on user devices, as well as removing from the user the burden of calculating the number of vehicles, planning vehicle times and routes, and coordinating separate trips/deliveries using different applications or technology platforms.

The techniques described herein can also provide additional item delivery options and costs to the user, based on analyzing and coordinating with the user's travel schedule. For instance, when users in conventional systems travel with a large amount of baggage or need to transport other items in connection with a trip, the users may engage a delivery service (e.g., the postal service or various commercial package delivery services) to ship the associated items from a pick-up location to the user's destination. However, delivery services can be costly and difficult to coordinate delivery of the user's baggage with the user's own trip itinerary. Further, any delays or changes to the user's travel schedule may cause a disconnect between the itineraries of the user and their baggage, and it may be difficult or impossible for the delivery service to reschedule the delivery to coordinate with the user's updated schedule. In contrast, the techniques described herein can reduce shipping costs in scenarios when the user's baggage or other associated items can travel on different vehicles and/or separate non-commercial flights operated by delivery services.

The techniques described herein may also include supporting baggage pick-up and delivery at different times and/or locations based on the user's travel schedule and/or delivery requirements provided via the user interface. In some examples, the transportation system may coordinate the baggage delivery so that the user need not personally load, carry, and unload their baggage at each leg in the travel itinerary, and item pick-ups and deliveries may be performed at separate locations without the user present (e.g., hotel bag stands, airport baggage drop-off doors, etc.). Additionally, the techniques described herein can include automated tracking and monitoring of delivery vehicles, with coordinated responses to delays or schedule changes associated with a passenger trip or an associated item delivery. When a delay or schedule change is detected for one vehicle itinerary, the transportation system can modify the associated vehicle itineraries to maintain coordination so that the passengers and their baggage items are delivered at the same time to the same location. As an example, when the user reroutes a passenger trip, the transportation system may automatically modify the baggage vehicle, delivery time, destination, and route to reduce transportation costs and/or maintain the time and location synchronization between the passenger and baggage items. The transportation system also may automatically adjust the baggage delivery schedule in response to driving or flight delays effecting the user, so that bags are not delivered and left unattended without the user present. Similarly, when detecting baggage delivery delays, the transportation system may automatically notify the user and allow the user to modify their itinerary (e.g., destination or arrival time) to coordinate with the updated baggage delivery schedule.

FIG. 1 illustrates an example process 100 of determining and executing a coordinated passenger trip with delivery of associated baggage items, using separate autonomous vehicles and/or separate driving routes. In various examples, some or all operations of the example process 100 may be performed by computing devices configured to implement a transportation system. The transportation system, described below in more detail, may receive transportation requests from user devices, select autonomous vehicles and determine delivery details, and then transmit instructions to the selected autonomous vehicles to perform the passenger trip and associated baggage delivery in a synchronized and coordinated manner.

At operation 102, the transportation system may receive a passenger transportation request from a user device. In some examples, the transportation system may be associated with a client application (e.g., mobile application) installed on user devices, configured to provide ride-hailing and/or delivery services using a fleet of autonomous vehicles. A registered user of the ride/delivery service may initiate a request to the transportation system via the mobile application or a browser-based user interface, to request a ride immediately at the user's current location or to schedule a ride for a future time. Box 104 illustrates a simplified user interface screen of a ride-hailing (and/or ride-sharing) application. As shown in this example, the user interface in box 104 prompts the user to provide basic ride details for the user's ride request, including a destination, number of passengers, and requested pick-up time. Additionally, box 104 includes a checkbox allowing the user to indicate whether the passengers have baggage to be transported in connection with the ride request.

At operation 106, the transportation system may determine times (e.g., pick-up and arrival times) and a route for the passenger trip based on the ride request received in operation 102. For an immediate ride request, the transportation system may select a nearby vehicle capable of transporting the number passengers indicated in the ride request. For example, a ride for one or two passengers may be provided by any number of vehicles in the fleet, while additional rides requested for more passengers (e.g., 5, 6, 7, 8, etc.) may require a larger or additional vehicle in the fleet with additional seating. The transportation system also may calculate the pick-up time based on the current location of the vehicle relative to the user, and the current traffic and road conditions. When the ride request is not an immediate request, the transportation system may select and reserve a vehicle for a future time window corresponding to the request. The transportation system may determine a driving route and/or arrival time based on the pick-up time, along with various map data, traffic data, weather and road condition data, user or vehicle driving preferences, and/or other factors. Examples of techniques for coordination of dispatching and routing of a fleet of autonomous vehicles can be found in U.S. patent application Ser. No. 14/756,996, filed Nov. 4, 2015 (now U.S. Pat. No. 9,958,864), which is incorporated herein by reference in its entirety for all purposes. Box 108 depicts a map that may be output via the user interface to display the user's current location as well as the passenger trip details (e.g., pick-up location and time, driving route, destination, estimated arrival time, etc.).

At operation 110, the transportation system receives baggage data and/or delivery requirements associated with the passenger trip. In some cases, the transportation system may provide an additional user interface, such as the example user interface screen shown in box 112, when the user indicates that baggage delivery is needed in connection with a ride request. The additional baggage data received in operation 110 may include details regarding the baggage items to be delivered (e.g., number of items, sizes, weights, item types, etc.), as well as the delivery details (e.g., pick-up time, delivery time, pick-up location, transportation requirements, etc.). The baggage data and delivery requirements received in operation 110 may include data received directly from a user via the user interface, and/or data retrieved by transportation system indicating the user preferences of the user or service account, the baggage delivery data from previous trips, etc. As shown in this example, the user interface may allow the user to identify particular baggage items as oversized or odd-sized bags, such as skis, golf clubs, snowboards, surfboards, strollers, boxes, crates, chests, furniture items, etc. Additionally or alternatively, the user interface may allow the user to designate particular baggage items with various special delivery requirements for (e.g., fragile, hazardous, perishable, etc.).

In some examples, the transportation system may determine in operation 110 that a delayed delivery of the baggage items may be permitted for this trip. For instance, the user may indicate via the user interface in box 112 that the associated baggage items need not be delivered at the same time the passengers arrive at the destination, but may be delivered at a later time or day. When delayed baggage delivery is permitted, the transportation system may determine multiple different baggage delivery options (e.g., pick-up and delivery times, vehicle types, transportation modes, etc.), and may present the delivery options to the user via the user interface in box 112. In some examples, each baggage delivery options presented to the user may have an associated delivery cost, thereby allowing the user to select the baggage delivery option that provides the desired combination of cost-efficiency and timely delivery.

At operation 114, the transportation system may determine delivery times and delivery route(s) for the baggage items associated with the passenger ride. Initially, the transportation system may determine whether the baggage items associated with the trip can be carried in the same vehicle as the passengers. For instance, based on the passenger data (e.g., number of passengers) and the baggage data (e.g., number and sizes of items), the transportation system may determine that the vehicle selected to transport the passengers can also carry the baggage. However, if the passenger vehicle cannot transport the baggage items, of if would be cost inefficient to transport the baggage items with the passengers, then the transportation system may select one or more vehicles separate from the passenger vehicle in the fleet to deliver the baggage items. The selection of the baggage delivery vehicle(s) may be based on the baggage data received in operation 110, including the number, size, weight, and type of baggage items, the presence of oversized or odd-shaped items, etc.

In some examples, the baggage delivery vehicles selected by the transportation system may include specialized item delivery vehicles that include access lockers instead of or in addition to passenger compartments. For instance, the transportation system may select an autonomous cargo delivery vehicle with a configuration of access lockers capable of storing the baggage items identified by the user in operation 110. Various examples of item delivery vehicles and locker configurations that may be used as baggage delivery vehicles can be found in U.S. patent application Ser. No. 17/131,268, entitled "Modular Delivery Vehicle With Access Lockers," filed Dec. 22, 2020, which is incorporated herein by reference in its entirety. Depending on the amount and size of the baggage items, as well as additional baggage data and/or delivery requirements, the transportation system may select one baggage delivery vehicle, or multiple baggage delivery vehicles, or may designate a portion of baggage delivery vehicle that is designated to transport baggage items associated with other passenger trips.

After selecting one or more baggage delivery vehicles from the fleet (which may include general vehicle types or model, or specific vehicles in the fleet), the transportation system may determine the route and delivery details for each baggage delivery vehicle. In some examples, baggage delivery vehicles may have different pick-up times, different pick-up locations, and/or different delivery times from the associated passenger vehicle and/or other baggage delivery vehicles. As noted above, the user may select an earlier baggage pick-up time and/or delayed baggage delivery time via the user interface, based on a reduced cost delivery option. Additionally, the baggage items need not be picked-up from the same location as the passengers in the associated trip, but may be picked-up from one or more different locations. Box 116 depicts a map that may be output via the user interface to display delivery routes for multiple different baggage delivery vehicles associated with a passenger trip, along with additional baggage delivery trip details (e.g., pick-up locations and times, driving routes, destinations, estimated arrival times, etc.).

At operation 118, the transportation system may transmit instructions to the passenger vehicle(s) and the baggage delivery vehicle(s) to control the vehicles to drive the determined routes at the appointed times, and to execute the passenger transport and baggage delivery tasks determined respectively in operations 106 and 114. The instructions transmitted from the transportation system to the passenger vehicle and baggage delivery vehicle(s) may include data such as the requested pick-up location and time, the requested destination location and arrival time, passenger identifiers, trip identifiers, and/or baggage item identifiers, etc. Box 120 depicts a transportation system computer server transmitting trip/delivery instructions via a wireless network, to a first autonomous vehicle configured as a passenger vehicle and a second autonomous vehicle configured as a cargo vehicle with access lockers.

Figure 2:
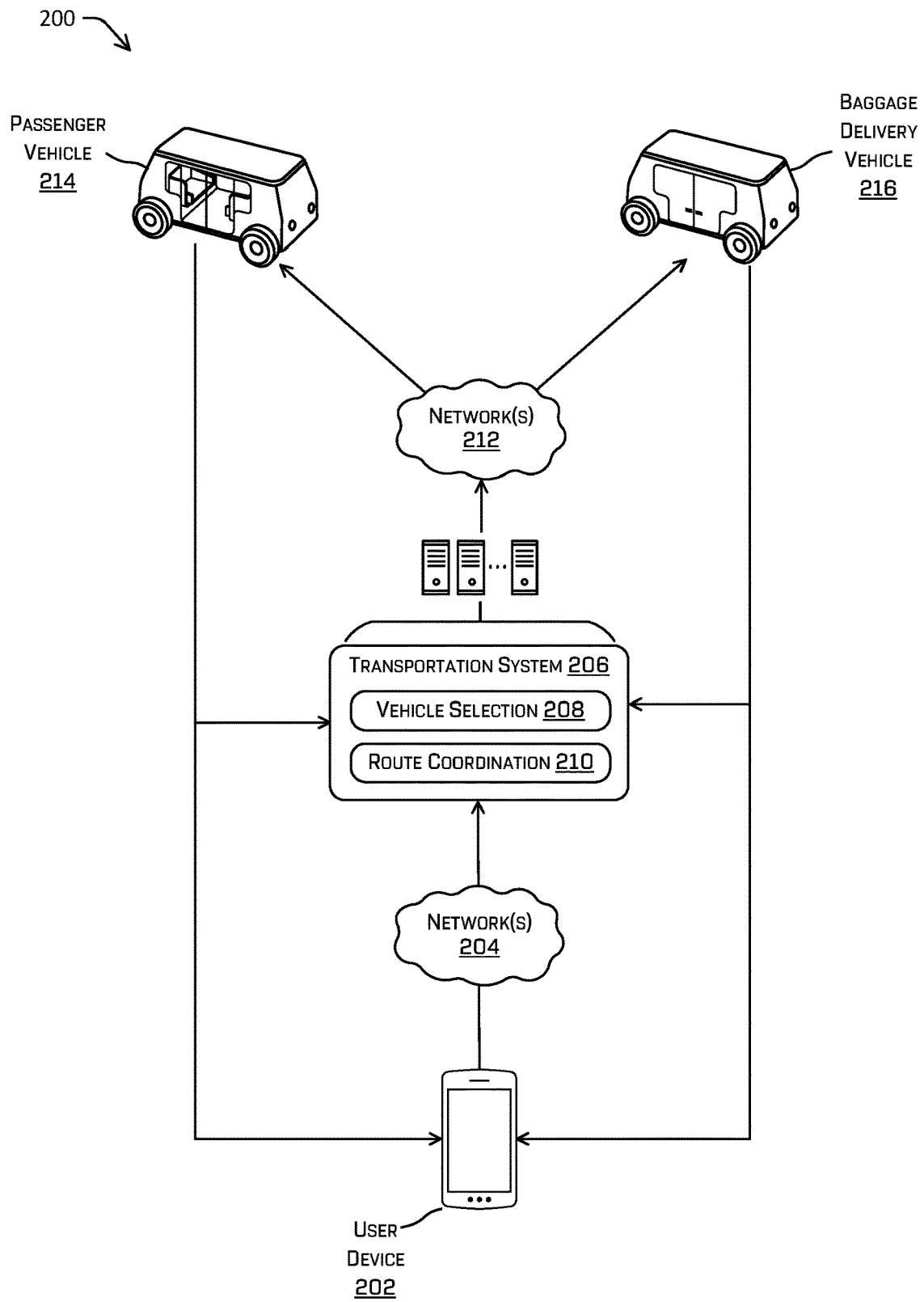
FIG. 2 is block diagram depicting an example computing environment for implementing various techniques described herein.

FIG. 2 illustrates an example computing environment 200 including a configuration of components configured to implement various techniques discussed herein. For example, computing environment 200 may be used to illustrate systems and methods of requesting, scheduling, executing and coordinating passenger transports and associated baggage item deliveries using separate autonomous vehicles. As shown in this example, a passenger trip may be initiated and requested by user (also referred to as a passenger) operating a user device 202. The user device 202 may comprise a mobile device such as a mobile phone, laptop or tablet computer, smart watch, wearable computing device, and/or any other personal computing device. The user device 202 may communicate via a first network 204 with a transportation system 206. The transportation system 206 may include one or more components implementing specialized functionality, such as a vehicle selection component 208 configured to determine the numbers, types, and characteristics of vehicles in a fleet of autonomous vehicles to perform the coordinated passenger and item transportation, and a route coordination component 210 configured to determine routes and coordinate transportation of passengers and delivery of associated baggage items in separate vehicles. The route coordination component 210 also may be configured to transmit transportation and delivery instructions via a wireless communication network 212 to passenger vehicle(s) 214 and delivery vehicles 216, and to coordinate deliveries, provide user notifications, and modify delivery itineraries in response to delays or schedule changes.

The passenger vehicle 214 and baggage delivery vehicle 216 may correspond to any of the vehicles described herein, and thus may include any features or combination of vehicles features discussed below in connection with FIG. 8. Although passenger vehicle(s) 214 and baggage delivery vehicle(s) 216 may be implemented as fully or partially autonomous vehicle, in various examples some or all of techniques described herein may use non-autonomous vehicles for passenger transport and baggage delivery as well. The transportation system 206 may be implemented using one or more computing devices or systems operating separately and independently, or may be fully or partially integrated within the user device 202 and/or with passenger vehicles 214 and delivery vehicles 216.

In this example, computing environment 200 illustrates a simplified scenario for requesting passenger transportation with associated baggage items, and providing the passenger transport and baggage delivery by deploying and coordinating separate vehicles. In response to the request from the user device 202, the transportation system 206 may use the vehicle selection component 208 to analyze the passenger data and baggage data, and to select one or more passenger vehicle(s) 214 and baggage delivery vehicle(s) 216 to perform the passenger transport and baggage deliveries. As noted above, the vehicle selection component 208 may select one or more baggage delivery vehicle(s) 216 based on the number of baggage items, item sizes, weights, types, and other characteristics of the items, pick-up location, and/or pick-up time.

The route coordination component 210 may be configured to determine routes for both the passenger vehicle(s) 214 and baggage delivery vehicle(s) 216 based on the respective pick-up locations, destination locations, pick-up times, and/or targeted arrival times. The route coordination component 210 may generate baggage delivery options to be provided to the user device 202, including different options for pick-up times, delivery times, and/or transportation vehicles/modes, along with corresponding baggage delivery costs for each option. After the transportation system 206 transmits passenger transport and baggage delivery instructions to the vehicles 214 and 216, the route coordination component 210 may track and monitor the vehicles 214 and 216 to maintain the coordination between the passenger(s) and associated baggage items. For example, the route coordination component 210 may receive status data, vehicle locations, arrival notifications and/or item delivery notifications, and may determine and transmit updated instructions to the passenger vehicle(s) 214 and/or baggage delivery vehicle(s) to maintain the synchronization in delivery times and locations between the vehicles 214 and 216.

In various examples, the passenger vehicle(s) 214 and/or baggage delivery vehicle(s) may transmit status data, updated arrival estimates, delivery notifications, and the like to the transportation system 206, directly to the user device 202, and/or to the other vehicles 214 and 216 associated with the same passenger trip. Transmissions to and from vehicle 214 and 216 may be sent via one or more wireless communication networks 212, such as cellular or WLAN networks for longer-range communications and/or Bluetooth, WiFi, or NFC for short-range communications. Although FIG. 2 is depicted with unidirectional arrows to illustrate the simple passenger and baggage transportation request and execution process outlined above, it should be understood that each device and system in this example may perform bi-directional communications with any or all other devices and systems. Additional process features and device interactions not depicted in this example may be performed in other examples, such as monitoring, modifications, and/or cancelations of a passenger trip or baggage delivery, on-route item tracking, passenger and delivery vehicle tracking, user location tracking, baggage delivery or pick-up notifications, etc. Further, although the transportation system 206 may be implemented as a centralized computing system configured to communicate with and control a fleet of passenger and delivery vehicles as shown in this example, in other examples, any or all of features and functionalities of the transportation system 206 may be integrated into the vehicles 214 and 216, which may user vehicle-to-vehicle communications via wireless communication network(s) 212 to schedule and coordinate passenger transport and baggage delivery in separate vehicles.

Figure 3:
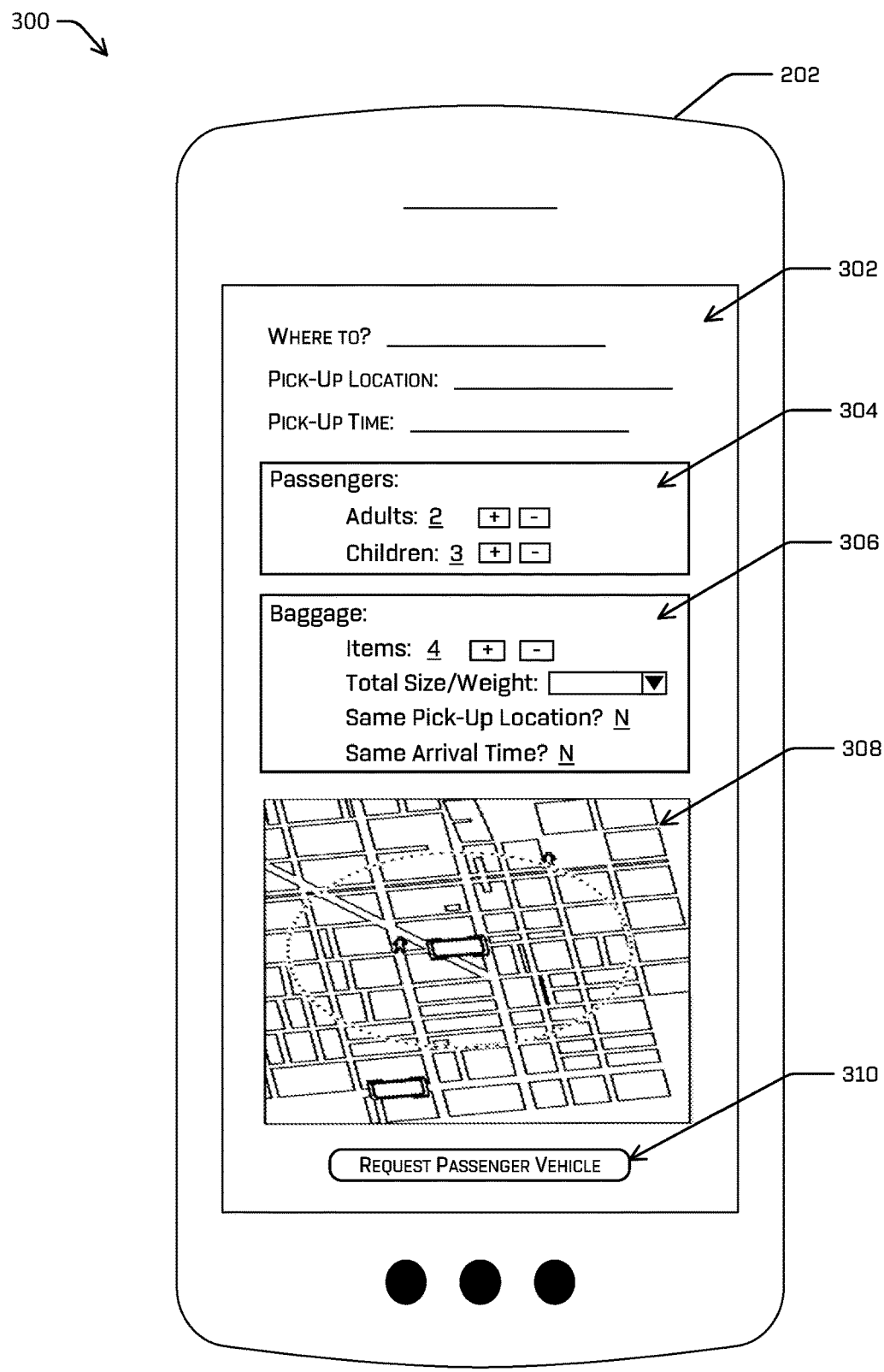
FIG. 3 is an example user interface screen displayed on a user device and illustrating a request for a passenger trip including associated baggage delivery, in accordance with implementations of the disclosure.

FIG. 3 depicts an example user interface 300 that may be generated and rendered on a user device 202 in communication with a transportation system 206. The user interface 300 may represent a user interface generated by a ride-hailing or ride-sharing application executing on the user device 202, and configured to allow a user to request a ride from the transportation system 206. In some examples, user interface 300 may correspond to the user interface screen depicted in box 104, described above.

In this example, the user interface 300 includes a set of input components 302 to allow the user to provide the basic details for the ride request, passenger data input box 304, a baggage data input box, a map 308 identifying the current location of the user device 202, and a button 310 to submit the ride request for a passenger vehicle. The set of input components 302 includes user interface controls to allow the user to input a trip destination, pick-up location, and pick-up time. The passenger data input box 304 includes user interface controls to allow the user to input the number of adults and the number of children that will be passengers on the requested trip. Although the passenger data input box 304 may be optional, examples includes a passenger data input box 304 or other components to receive the numbers of passengers and/or passenger details (e.g., adults and children) may provide advantages to the transportation system 206 in selecting the passenger vehicle(s) 214 and baggage delivery vehicle(s) 216. For example, the vehicle selection component 208 may use the numbers of passengers to determine how many baggage items can be delivered in the passenger vehicle 214. In some cases, based on the numbers of passengers and amount of baggage, the vehicle selection component 208 may select a hybrid passenger/baggage vehicle including a first portion of the vehicle body configured as a passenger compartment and second portion configured to store baggage items. Additionally, if the number of passengers input by the user exceeds the number that can be transported by a single passenger vehicle 214, the vehicle selection component 208 may select a different type of passenger vehicle 214 (e.g., a van, minibus, etc.) or may select multiple different passenger vehicles 214 to transport the passengers.

In this example, the baggage data input box 306 includes user interface controls to allow the user to input the number of baggage items and baggage details (e.g., weight, size, etc.) relating to the baggage items associated with the passenger ride request. Additionally, the baggage data input box 306 includes controls (e.g., checkboxes) to allow the user to indicate whether the baggage items have the same pick-up location as the passengers, and baggage items are to be delivered at the same time as the passengers. As described below, the user input received in these controls may determine the subsequent user interface screens and controls rendered on the user device 202, and may be used by the vehicle selection component 208 and/or route coordination component 210 to select and deploy the baggage delivery vehicle(s) 216. For example, when the user indicates that the baggage items do not have the same pick-up location as the passengers, the user interface 300 (or a subsequent user interface) may prompt the user to provide the baggage pick-up location and time, and the route coordination component 210 may use this data to determine a different route for the baggage delivery vehicle(s) 216. Additionally, when the user indicates that the baggage items need not be delivered at the same arrival time as the passengers, the route coordination component 210 may determine one or more different delayed delivery options having different transportation modes and/or reduced delivery costs.

Figure 4:
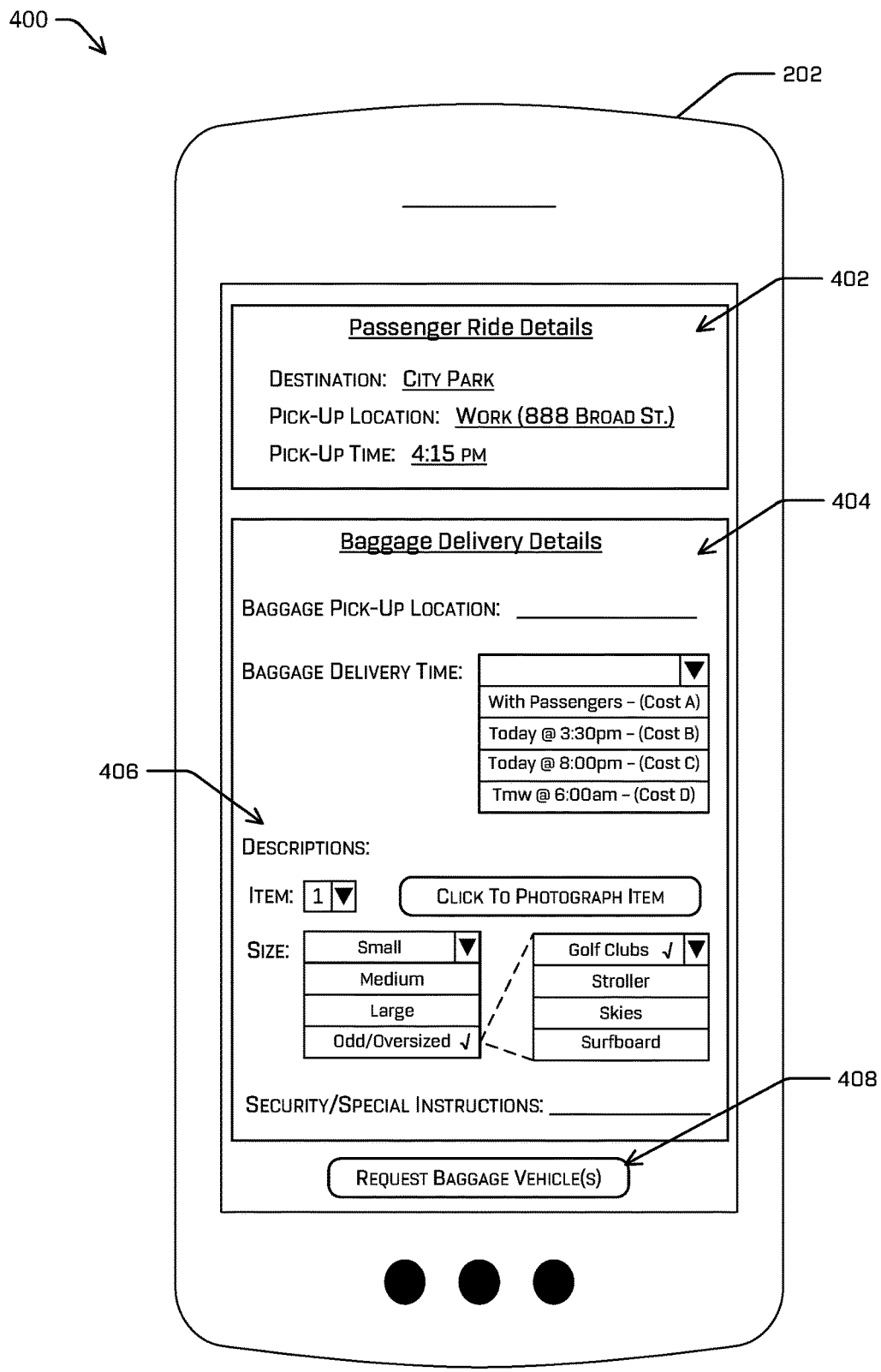
FIG. 4 is an example user interface screen displayed on a user device and illustrating a request for baggage delivery associated with a passenger trip, in accordance with implementations of the disclosure.

FIG. 4 depicts another example user interface 400 that may be generated and rendered on a user device 202 in communication with a transportation system 206. In some examples, user interface 400 may represent a subsequent user interface generated by a ride-hailing or ride-sharing application, to obtain additional baggage data after the user indicates that one or more baggage items are to be delivered in conjunction with the passenger ride. In some examples, user interface 400 may correspond to the user interface screen depicted in box 112, described above.

In this example, the user interface 400 includes a box 402 displaying the passenger ride details. The passenger ride details in box 402 may correspond to the ride request details provided by the user in user interface 300, and/or the ride details arranged for the user by the transportation system 206 based on the ride request. The user interface 400 also includes a number of input controls to allow the user to input baggage data and baggage delivery request details. For example, in region 404 the user interface 400 includes an input control to allow the user to provide a baggage pick-up location, and an input control to allow the user to select a baggage delivery time. In some examples, these input controls may be rendered in user interface 400 based on the user indicating in a previous user interface (e.g., user interface 300) that the baggage items do not have the same pick-up location as the passengers, and that the baggage items do not need to be delivered at the same arrival time as the passengers. As shown in this example, region 404 include a drop-down menu with different options for on-time or delayed baggage delivery, and corresponding costs for each baggage delivery option.

Region 406 within user interface 400 includes additional input controls to allow the user to provide additional baggage data. The vehicle selection component 208 may use the additional baggage data to determine the vehicle selections for delivering the baggage items, such as the number of baggage delivery vehicles needed, the size and storage configurations of the vehicles, and other delivery vehicle features or capabilities. In this example, the region 406 allows the user to input, for each baggage item, an item size, an item type/description (for odd-sized or oversized items), and any security considerations or special instructions for transporting and delivering the item. Additionally, region 406 includes a button control that activates the camera feature of the user device 202 to allow the user to take a picture of the item. In some examples, the vehicle selection component 208 may use the image data of the baggage items to determine the size, shape, material and other characteristics of the baggage items, and then may use the characteristics of the baggage items to select the baggage delivery vehicle(s) 216. After inputting the baggage delivery details and baggage descriptions into regions 404 and 406, respectively, the user may select button 408 to submit the associated baggage data for the passenger trip to the transportation system 206.

Additionally, as noted above the transportation system may support different pick-up times, different pick-up locations, and/or delayed baggage item delivery in some cases. In such cases, the transportation system may determine different transportation and delivery options for the passengers the associated items, and may present the different options including associated transportation/delivery costs via a user interface. For instance, delivery options for a set of baggage items can include different transportation options for the baggage, such as mailing/shipping the baggage versus the passenger traveling with their baggage. These different options may be presented in region 404 of the user interface. The transportation system also may aggregate costs for different segments of a multi-segment trip (e.g., a first driving segment, second flying segment, third driving segment, etc.). The region 404 of the user interface 400 may present both the individual segment costs and aggregated trip costs, both for the passengers and the associated baggage items. Based on the individual segment costs and aggregated trip costs, the user interface 400 may provide functionality for the user to change passenger or baggage trip itineraries and/or individual segments (e.g., to different times or transportation modes), after which the individual segment costs and aggregated trip costs may be updated on the user interface.

Figure 5:
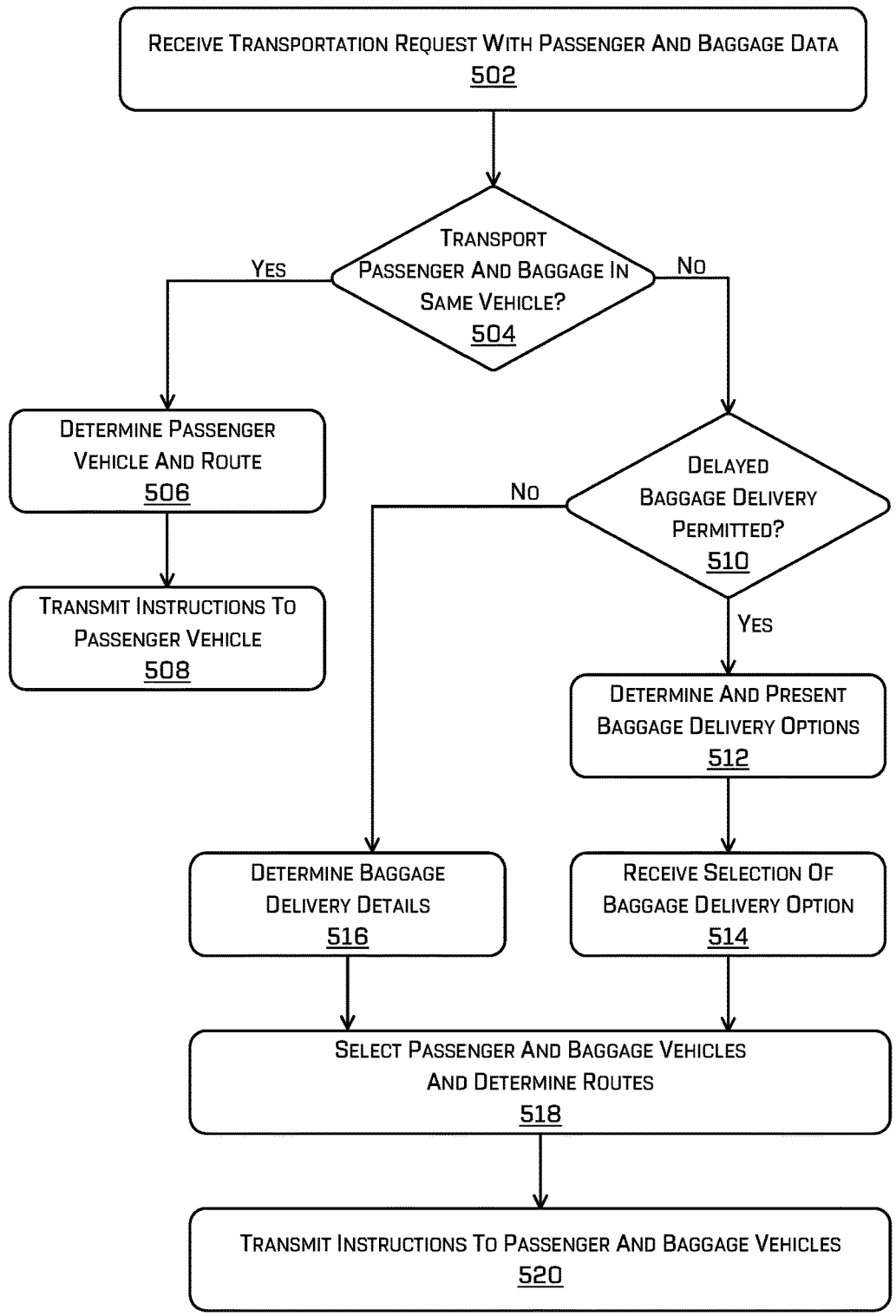
FIG. 5 is flow diagram illustrating an example process of performing a coordinated passenger trip and baggage delivery in separate vehicles, in accordance with implementations of the disclosure.

FIG. 5 is a flow diagram illustrating an example process 500 for coordinated passenger trip and baggage delivery in separate vehicles. As described below, at least some operations of process 500 may be performed by the components of a transportation system 206, including a vehicle selection component 208 and route coordination component 210. Using the functionalities described in connection with these components, the transportation system 206 may receive a transportation request from a user device, select vehicles and arrange passenger transport and delivery of associated baggage items in a coordinated manner, using separate specialized passenger vehicle(s) 214 and baggage delivery vehicle(s) 216.

At operation 502, the transportation system may receive a request with passenger data and baggage data. The request may correspond to a request for a passenger ride from a ride-hailing or ride-sharing service provided the transportation system 206. The request may be received from a user device 202, via one or more user interfaces (e.g., user interfaces 300 and 400). The passenger data received in operation 502 may include the numbers of passengers to be transported and the passenger types/characteristics (e.g., sizes, weights, adults or children, etc.). The baggage data may include the number of baggage items and/or details for each baggage item (or for the aggregated baggage load as a whole), such as the baggage item sizes, weights, types (e.g., particular oversized or odd-sized baggage), and/or other characteristics of the baggage items to be delivered in associated with the passenger ride.

At operation 504, the transportation system may determine whether the passengers and baggage items can be transported in the same passenger vehicle. For instance, based on the number of passengers, baggage data (e.g., number and sizes of baggage items), and the capacities of the available passenger vehicle(s) 214, the transportation system 206 may determine that a passenger vehicle 214 selected to transport the passengers is capable of delivering the associated baggage items as well (504:Yes). In such cases, the transportation system 206 selects a passenger vehicle 214 and determines a delivery route in operation 506, and transmits instructions to the selected passenger vehicle 214 in operation 508. The passenger trip route determined in operation 506 may include single pick-up stop, or multiple stops to pick-up the passenger(s) and baggage items at separate pick-up locations.

In other examples, when the transportation system 206 determines based on the passenger data and baggage data that a single passenger vehicle cannot also transport the baggage items, or determines that it may be inefficient or costly transport the passengers and baggage items in the same vehicle (504:No), then in operation 510 to transportation system 206 determines whether delayed delivery of the baggage items is permitted for the passenger trip. In some examples, the user may indicate via a user interface whether the baggage items associated with the trip are to be delivered with the same arrival time as the passengers, or whether the baggage items may be delivered at a later time.

When the user indicates (e.g., via the user interface or previously stored user preferences) that delayed baggage delivery is permitted for this passenger trip (510:Yes), then in operation 512 the transportation system 206 determines a number of different baggage delivery options. In some examples, each delivery option may include a pick-up time, delivery time, transportation mode or characteristics, and a corresponding baggage delivery cost. As discussed above, baggage delivery costs may be reduced in some cases when the baggage can be picked-up early and/or delivered later than the associated passengers. The additional transportation time may allow the route coordination component 210 to determine one or more delivery routes involving slower but less expensive transportation modes, such as shared baggage delivery vehicles, separate non-commercial (e.g., cargo) flights operated by delivery services, or ground delivery options rather than flying. In operation 512, the transportation system 206 also may present the baggage delivery options that were determined by the route coordination component 210, to the user via the user interface. In operation 514, the transportation system 206 receives a selection of a delivery option for the baggage items (e.g., a pick-up time, estimated delivery time, transportation mode, etc.) from the user via the user interface.

In other examples, when the user indicates that delayed baggage delivery is not permitted for this passenger trip (510:No), then in operation 516 the transportation system 206 may determine the baggage delivery details based on the corresponding passenger trip details. In some cases, although the baggage pick-up and/or delivery times may be based on the corresponding passenger pick-up and estimated arrival times, the baggage items may have pick-up locations different from the pick-up location of the passengers. Additionally, in some examples, the transportation system 206 may select and deploy multiple baggage delivery vehicle(s) 216 to transport different sets of baggage items associated with the same passenger ride, wherein each set of baggage items may have a different pick-up location and/or different requirements with respect to early pick-up times and delayed delivery times.

At operation 518, after determining the number(s) of passenger and baggage delivery vehicles to be used, and the transport/delivery details for each vehicle (e.g., pick-up and drop-off times and locations), the transportation system 206 may select the passenger vehicle(s) 214 and baggage delivery vehicle(s) 216 based on the passage and baggage data, and may determine driving routes for each associated vehicle. The vehicles may be selected by the vehicle selection component 208, based on the numbers and characteristics of the passengers and/or baggage items to be transported, and the availability and capabilities of different vehicles in the fleet at times corresponding to the requested trip. Driving routes may be determined by the route coordination component 210 for each passenger vehicle 214 and each baggage delivery vehicle 216, based on the pick-up times and locations, required arrival times and destination location, along with various map data, traffic data, weather and road condition data, user or vehicle driving preferences, and/or other factors.

At operation 520, the transportation system 206 may transmit instructions to each of the selected passenger vehicle(s) 214 and baggage delivery vehicle(s) 216, to control the vehicles to drive the determined routes at the appointed times, and to execute the passenger transport and baggage delivery operations determined for that vehicle. The instructions transmitted from the transportation system 206 to the passenger vehicle(s) 214 and baggage delivery vehicle(s) 216 may include, but is not limited to, requested pick-up locations and times, the requested destination locations and required delivery/drop-off times, passenger identifiers, trip identifiers, and/or baggage item identifiers, etc. In some examples, the transportation system 206 also may transmit vehicle identifier (e.g., vehicle descriptions, license plate numbers, etc.), to the user device 202 to allow the user to recognize and access the passenger vehicle(s) 214 and baggage delivery vehicle(s) 216 when arriving at the pick-up location.

Figure 6:
FIG. 6 is an example user interface screen depicting a street map and illustrating a coordinated itinerary between a passenger trip and associated items using separate vehicles and different delivery routes, in accordance with implementations of the disclosure.

FIG. 6 shows an example map user interface 600 showing the itineraries of a coordinated passenger transport and two associated baggage deliveries performed by separate vehicles. As noted above, the transportation system 206 may provide tracking, monitoring, and route modification capabilities to maintain the synchronization in delivery times and/or locations between the passenger vehicle(s) 214 and baggage delivery vehicle(s) 216. In some examples, the transportation system 206 may provide the map user interface 600 to allow the user to visually track the associated passenger and baggage delivery vehicles during the timeframe of the passenger trip and associated baggage delivery. In this example, the map user interface 600 identifies the passenger pick-up location with a passenger icon 602, along with the associated passenger vehicle 604 and driving route 606. The passenger trip in this example includes two associated baggage delivery vehicles 216, each of having different pick-up locations and driving routes. A first baggage icon 608 indicating a baggage pick-up location is also identified on the map user interface 600, along with the associated baggage delivery vehicle 610 and driving route 612. A second baggage icon 614 indicates a second baggage pick-up location identified on the map user interface 600, along with a second baggage delivery vehicle 616 and driving route 618. In this example, the two baggage delivery vehicles 610 and 616 have picked-up their respective items and are driving on-route to the destination of the passenger trip indicated by the icon 620. The passenger vehicle 604 is on-route to pick-up the passenger, and will then proceed to the same destination shown by icon 620. The transportation system 206 in this example may coordinate the passenger transport and separate baggage delivery vehicles to arrive at the same destination and at the same time (or at separate delivery times requested by the user).

Figure 7:
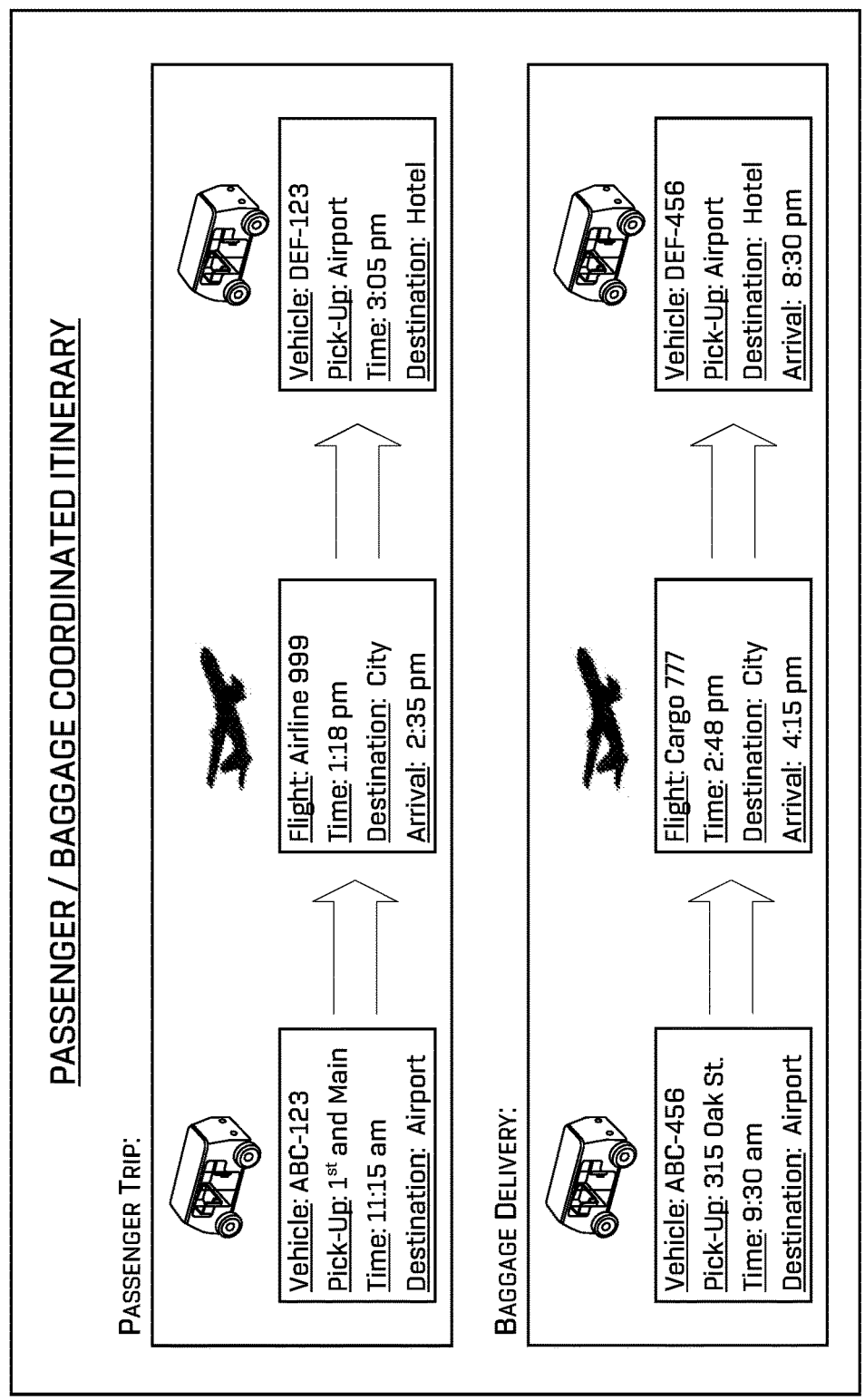
FIG. 7 is an example user interface screen illustrating a coordinated itinerary between a passenger trip and the delivery of associated items using separate vehicles and different delivery routes, in accordance with implementations of the disclosure.

FIG. 7 shows another example user interface 700 illustrating a coordinated itinerary between a passenger trip and an associated baggage delivery using separate vehicles and different delivery routes. In this example, user interface 700 provides a single view of a client application to allow the user to schedule, track, and perform coordinated updates on passenger trips having associated baggage deliveries using separate vehicles. As shown in this example, the passenger and baggage delivery routes determined by the route coordination component 210 may include transportation routes having multiple segments (e.g., multi-leg and/or multi-mode transportation routes), including a combination of driving segments, flying segments, and/or segments on other transport modes. As shown in this example, both the passengers and the baggage items associated with the passenger trip may have a trip route including a first driving segment to the airport, a flight to a destination city, and then a second driving segment to a hotel in the destination city. However, the route coordination component 210 in this example has selected entirely different itineraries for the passengers and the baggage items. For instance, based on user input received via user interfaces 300 and 400, the transportation system 206 has selected an early pick-up time, a delayed delivery time, and a less expensive flight for the baggage items that is compatible with the pick-up and delivery times of the baggage items.

The user interface 700 also may be configured to receive data updates from the transportation system 206 (and/or directly from the vehicles 214 and 216) and to provide notifications via the user device 202. Such notifications may include but are not limited data, vehicle tracking data, vehicle status and location updates, baggage delivery notifications, delays or schedule changes, route modifications by the user, etc. In response to delays or schedule changes to the passenger trip itinerary and/or the associated baggage delivery itinerary, the user interface 700 may update automatically to alert the user, and may provide the user with an updated user interface to allow the user to update the timing and/or delivery route of the other associated vehicle(s).

Figure 8:
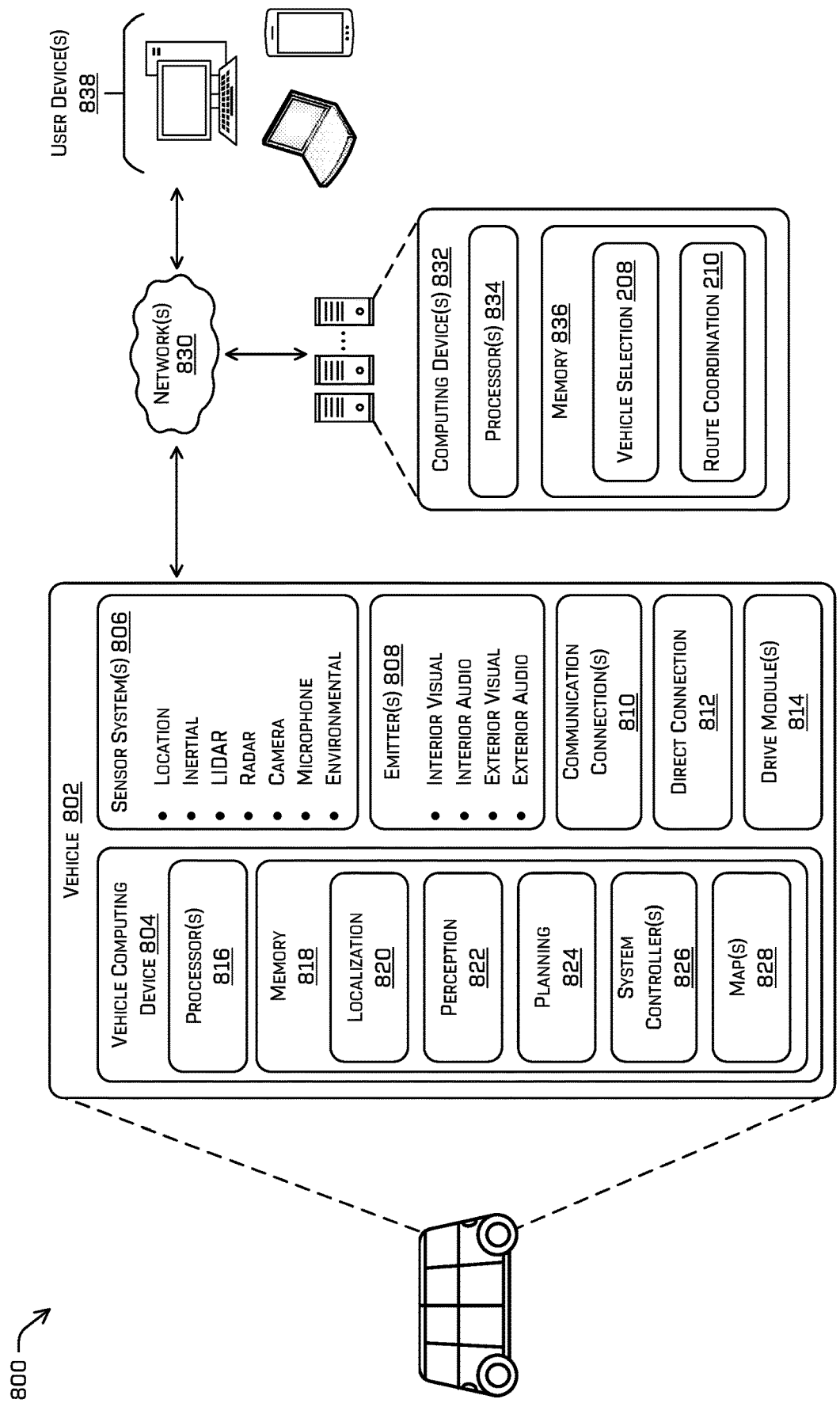
FIG. 8 depicts a block diagram of an example architecture for implementing various techniques described herein.

FIG. 8 depicts a block diagram of an example system 800 for implementing the techniques described herein. The vehicle 802 in this example may correspond to any of the vehicles described herein, including any of various configurations of autonomous vehicles for transporting passengers or their associated items. That is, each of the example vehicles discussed above in reference to FIGS. 1-7 and/or any other example vehicles described herein, may include any combination of the features of vehicle 802 also may be incorporated within a similar or identical computing system. As shown in this example, vehicle 802 may include one or more vehicle computing devices 804, one or more sensor systems 806, one or more emitters 808, one or more communication connections 810, at least one direct connection 812, and one or more drive assemblies 814.

The vehicle 802 may include various software-based and/or hardware-based components of an autonomous vehicle, and may be used to control autonomous vehicles traversing through physical environments. For example, vehicle 802 can be a hardware-based and/or software-based controller for a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some instances, a vehicle control system may operate within a real associated vehicle, such as a fully or partially autonomous vehicle having any other level or classification. In some instances, the techniques described herein may be usable by non-autonomous vehicles as well. Additionally or alternatively, the vehicle 802 may operate independently from a physical vehicle, for example, as a hardware and software-based controller for a simulated vehicle executing in a computing environment during the development, testing, and validation processes for the vehicle 802.

The vehicle 802 can be used for any configuration of passenger and/or item transportation vehicles, such as, for example, a van, a sport utility vehicle, a cross-over vehicle, a truck, a bus, an agricultural vehicle, and/or a construction vehicle. Vehicle 802 can be powered by one or more internal combustion engines, one or more electric motors, hydrogen power, any combination thereof, and/or any other suitable power sources. Although vehicle 802 may have four wheels, the associated techniques described herein can be incorporated into vehicles having fewer or a greater number of wheels, and/or tires. The vehicle 802 can include systems to control vehicles having four-wheel steering and can operate generally with equal or similar performance characteristics in all directions, for example, such that a first end of the vehicle is the front end of the vehicle when traveling in a first direction, and such that the first end becomes the rear end of the vehicle when traveling in the opposite direction. Similarly, a second end of the vehicle is the front end of the vehicle when traveling in the second direction, and such that the second end becomes the rear end of the vehicle when traveling in the opposite direction. These example characteristics may facilitate greater maneuverability, for example, in small spaces or crowded environments, such as parking lots and/or urban areas.

The vehicle computing device 804 can include one or more processors 816 and memory 818 communicatively coupled with the one or more processors 816. In the illustrated example, the vehicle 802 is an autonomous vehicle; however, the vehicle 802 could be any other type of vehicle, or any other system having one or more sensor systems. In the illustrated example, the memory 818 of the vehicle computing device 804 stores a localization component 820, a perception component 822, a planning component 824, one or more system controllers 826, and one or more maps 828. Though depicted in FIG. 8 as residing in memory 818 for illustrative purposes, it is contemplated that the localization component 820, the perception component 822, the planning component 824, the one or more system controllers 826, and the one or more maps 828 may additionally, or alternatively, be accessible to the vehicle 802 (e.g., stored remotely).

In at least one example, the localization component 820 can include functionality to receive data from the sensor system(s) 806 to determine a position of the vehicle 802. For example, the localization component 820 can include and/or request/receive a map of an environment and can continuously determine a location of the autonomous vehicle within the map. In some instances, the localization component 820 can utilize SLAM (simultaneous localization and mapping) or CLAMS (calibration, localization and mapping, simultaneously) to receive image data, LIDAR data, radar data, IMU data, GPS data, wheel encoder data, and the like to accurately determine a location of the autonomous vehicle. In some instances, the localization component 820 can provide data to various components of the vehicle 802 to determine an initial position of an autonomous vehicle for generating a candidate trajectory, as discussed herein.

In some instances, the perception component 822 can include functionality to perform object detection, segmentation, and/or classification. In some examples, the perception component 822 can provide processed sensor data that indicates a presence of an entity that is proximate to the vehicle 802 and/or a classification of the entity as an entity type (e.g., car, pedestrian, cyclist, animal, building, tree, road surface, curb, sidewalk, unknown, etc.). In additional and/or alternative examples, the perception component 822 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 824 can determine a path for the vehicle 802 to follow to traverse through an environment. For example, the planning component 824 can determine various routes and trajectories and various levels of detail. For example, the planning component 824 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 824 can generate an instruction for guiding the autonomous vehicle along at least a portion of the route from the first location to the second location. In at least one example, the planning component 824 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique.

In at least one example, the vehicle computing device 804 can include one or more system controllers 826, which can be configured to control steering, propulsion, braking, safety, emitters, communication, and other systems of the vehicle 802. These system controller(s) 826 can communicate with and/or control corresponding systems of the drive assembly(s) 814 and/or other components of the vehicle 802.

The memory 818 can further include one or more maps 828 that can be used by the vehicle 802 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 828 may include at least one map (e.g., images and/or a mesh) generated in accordance with the techniques discussed herein. In some example, the vehicle 802 can be controlled based at least in part on the maps 828. That is, the maps 828 can be used in connection with the localization component 820, the perception component 822, and/or the planning component 824 to determine a location of the vehicle 802, identify objects in an environment, and/or generate routes and/or trajectories to navigate within an environment.

In some examples, the one or more maps 828 may be stored on a remote computing device(s) (such as the computing device(s) 832) accessible via network(s) 830. In some examples, multiple maps 828 may be stored based on, for example, a characteristic (e.g., type of entity, time of day, day of week, season of the year, etc.). Storing multiple maps 828 may have similar memory requirements, but increase the speed at which data in a heat map may be accessed.

In some instances, aspects of some or all of the components discussed herein may include any models, algorithms, and/or machine learning algorithms. For example, in some instances, the components in the memory 818 (and the memory 836, discussed below) may be implemented as a neural network. As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

In at least one example, the sensor system(s) 806 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 806 can include multiple instances of each of these or other types of sensors. For instance, the LIDAR sensors can include individual LIDAR sensors located at the corners, front, back, sides, and/or top of the vehicle 802. As another example, the camera sensors can include multiple cameras disposed at various locations about the exterior and/or interior of the vehicle 802. The sensor system(s) 806 can provide input to the vehicle computing device 804. Additionally or alternatively, the sensor system(s) 806 can send sensor data, via the one or more networks 830, to the one or more computing device(s) at a particular frequency, after a lapse of a predetermined period of time, in near real-time, etc.

The vehicle 802 can also include one or more emitters 808 for emitting light and/or sound, as described above. The emitters 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 808 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 can also include one or more communication connection(s) 810 that enable communication between the vehicle 802 and one or more other local or remote computing device(s). For instance, the communication connection(s) 810 can facilitate communication with other local computing device(s) on the vehicle 802 and/or the drive assembly(s) 814. Also, the communication connection(s) 810 can allow the vehicle to communicate with other nearby computing device(s) (e.g., other nearby vehicles, traffic signals, etc.). The communications connection(s) 810 also enable the vehicle 802 to communicate with a remote teleoperations computing device or other remote services.

The communications connection(s) 810 can include physical and/or logical interfaces for connecting the vehicle computing device 804 to another computing device or a network, such as network(s) 830. For example, the communications connection(s) 810 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 802 can include one or more drive assemblies 814. In some examples, the vehicle 802 can have a single drive assembly 814. In at least one example, if the vehicle 802 has multiple drive assemblies 814, individual drive assemblies 814 can be positioned on opposite ends of the vehicle 802 (e.g., the front and the rear, etc.). In at least one example, the drive assembly(s) 814 can include one or more sensor systems to detect conditions of the drive assembly(s) 814 and/or the surroundings of the vehicle 802. By way of example and not limitation, the sensor system(s) can include one or more wheel encoders (e.g., rotary encoders) to sense rotation of the wheels of the drive assemblies, inertial sensors (e.g., inertial measurement units, accelerometers, gyroscopes, magnetometers, etc.) to measure orientation and acceleration of the drive assembly, cameras or other image sensors, ultrasonic sensors to acoustically detect objects in the surroundings of the drive assembly, LIDAR sensors, radar sensors, etc. Some sensors, such as the wheel encoders can be unique to the drive assembly(s) 814. In some cases, the sensor system(s) on the drive assembly(s) 814 can overlap or supplement corresponding systems of the vehicle 802 (e.g., sensor system(s) 806).

The drive assembly(s) 814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 814 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more programs or instructions to perform various functionalities of the drive assembly(s) 814. Furthermore, the drive assembly(s) 814 also include one or more communication connection(s) that enable communication by the respective drive assembly with one or more other local or remote computing device(s).

In at least one example, the localization component 820, perception component 822, and/or the planning component 824 can process sensor data, as described above, and can send their respective outputs, over the one or more network(s) 830, to one or more computing device(s) 832 (and/or one or more user devices 838). In at least one example, the localization component 820, the perception component 822, and/or the planning component 824 can send their respective outputs to the one or more computing device(s) 832 or user devices 838 at a particular frequency, after a lapse of a predetermined period of time, in near real-time, etc.

As described above with reference to FIGS. 1-7, and as discussed throughout this disclosure, the vehicle 802 can send sensor data to computing device(s) 832 and/or user devices 838, via the network(s) 830. The execute the components deployed therein and perform the corresponding functionality, the computing device(s) 832 can include one or more processors 834 and memory 836 communicatively coupled with the one or more processors 834. In some examples, the vehicle 802 can send raw sensor data to the computing device(s) 832. In other examples, the vehicle 802 can send processed sensor data and/or representations of sensor data to the computing device(s) 832. In some examples, the vehicle 802 can send sensor data to the computing device(s) 832 user devices 838 at a particular frequency, after a lapse of a predetermined period of time, in near real-time, etc. In some cases, the vehicle 802 can send sensor data (raw or processed) to the computing device(s) 832 as one or more log files.

In some examples, computing device(s) 832 may implement a transportation system configured to implement and coordinate transportation of passengers and delivery of items in separate vehicles, similar or identical to the transportation system 206 described above. In such examples, computing device(s) 832 may include a vehicle selection component 208 configured to determine the numbers, types, and characteristics of vehicles in a fleet of autonomous vehicles to perform the coordinated passenger and item transportation, and/or a route coordination component 210 configured to determine routes and coordinate transportation of passengers and associated items in separate vehicles, transmit transportation and delivery instructions to the vehicle(s) 802, and monitor the transportation and delivery by the vehicle(s) 802. The vehicle selection component 208 and route coordination component 210 may be similar or identical to the corresponding components described above, and may be configured to implement any combination of functionalities described herein for implementing and coordination passenger and item transportation.

In at least one example, the computing device(s) 832 can correspond to the transportation system 206 of FIG. 2, and the components depicted within the computing device(s) 832 may be similar or identical to the corresponding components described above in connection with FIG. 2. Additionally, the user device(s) 838 can correspond to user device 202, and may be configured to receive and render a user interface to collect passenger ride data and coordinated item delivery data from the user, and to provide user input data to the vehicle selection component 208 and the route coordination component 210 of the computing device(s) 832. The same or different user device(s) 838 also may be configured to receive and output notifications from the vehicle(s) 802 and/or the computing device(s) relating to status updates, delivery notifications, route modifications, etc.

The processor(s) 816 of the vehicle 802 and the processor(s) 834 of the computing device(s) 832 can be any suitable processor capable of executing instructions to process data and perform operations as described herein. By way of example and not limitation, the processor(s) 816 and 834 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 818 and memory 836 are examples of non-transitory computer-readable media. Memory 818 and memory 836 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 8 is illustrated as a distributed system, in alternative examples, components of the vehicle 802 can be associated with the computing device(s) 832 and/or components of the computing device(s) 832 can be associated with the vehicle 802. That is, the vehicle 802 can perform one or more of the functions associated with the computing device(s) 832, and vice versa. Additionally, any or all of the components associated with a transportation system 206, such as a vehicle selection component 208 and a route coordination component 210, may be implemented within a user device 838, which may communicate directly with one or more vehicles 802 without the use of intermediary computing device(s) 832.

Example Clauses

A. A system comprising: one or more processors; and one or more computer-readable media storing computer-executable instructions that, when executed, cause the one or more processors to perform operations comprising: receiving a transportation request indicating a first pick-up location and a destination location; determining passenger data based at least in part on the transportation request, wherein the passenger data indicates at least one passenger associated with the transportation request; determining item data associated with the transportation request, wherein the item data includes at least one of an item weight, an item size, an item type, or a number of items; determining a number of vehicles associated with the transportation request, based at least in part on the passenger data and the item data, wherein the number of vehicles associated with the transportation request is at least two; determining a first vehicle within a fleet of vehicles to transport the at least one passenger, based at least in part on the passenger data; determining a second vehicle within the fleet of vehicles to transport one or more items, based at least in part on the item data; causing a first instruction to be sent to the first vehicle to transport the at least one passenger from the first pick-up location to the destination location; and causing a second instruction to be sent to the second vehicle to transport the one or more items from a second pick-up location to the destination location.

B. The system as recited in paragraph A, wherein the passenger data includes a first pick-up time and the item data includes a second pick-up time different from the first pick-up time; wherein the first instruction comprises the first pick-up location, the first pick-up time, and a first identifier associated with the at least one passenger; and wherein the second instruction comprises the second pick-up location, the second pick-up time, and a second identifier associated with the one or more items.

C. The system as recited in paragraph A, the operations further comprising: receiving a passenger pick-up time associated with the transportation request; determining, based at least in part on the passenger pick-up time, a first item itinerary including a first item pick-up time, and a second item itinerary including a second item pick-up time; determining a first cost associated with the first item itinerary; determining a second cost associated with the second item itinerary; transmitting, to a user device associated with the transportation request, the first item itinerary including the first item pick-up time and the first cost, and the second item itinerary including the second item pick-up time and the second cost; and receiving, from the user device, a selection of the first item itinerary or the second item itinerary.

D. The system as recited in paragraph A, wherein: determining the first vehicle is based at least in part on determining that the first vehicle includes a passenger compartment compatible with the passenger data; and determining the second vehicle is based at least in part on determining that the second vehicle includes a storage compartment compatible with the item data.

E. The system as recited in paragraph A, the operations further comprising: determining a first route for the first vehicle, including the first pick-up location and the destination location; and determining a second route for the second vehicle, including the second pick-up location and the destination location, wherein the second route is different from the first route.

F. A method comprising: receiving, by a transportation system, a transportation request indicating a destination; determining, by the transportation system, passenger data based at least in part on the transportation request, wherein the passenger data indicates a passenger associated with the transportation request; determining, by the transportation system, item data based at least in part on the transportation request, wherein the item data indicates an item associated with the transportation request; causing, by the transportation system, a first instruction to be sent to a first vehicle to transport the passenger to a first drop-off location; and causing, by the transportation system, a second instruction to be sent to a second vehicle to transport the item to a second drop-off location.

G. The method of paragraph F, wherein the passenger data includes a first pick-up time and the item data includes a second pick-up time different from the first pick-up time; wherein the first instruction comprises the first pick-up time, and a first identifier associated with the passenger; and wherein the second instruction comprises the second pick-up time, and a second identifier associated with the item.

H. The method of paragraph F, further comprising: receiving a passenger pick-up time associated with the transportation request; determining, based at least in part on the passenger pick-up time, a first item itinerary including a first item pick-up time, and a second item itinerary including a second item pick-up time; determining a first cost associated with the first item itinerary; determining a second cost associated with the second item itinerary; transmitting, to a user device associated with the transportation request, the first item itinerary including the first item pick-up time and the first cost, and the second item itinerary including the second item pick-up time and the second cost; and receiving, from the user device, a selection of the first item itinerary or the second item itinerary.

I. The method of paragraph F, further comprising: determining item specification data associated with the item, the item specification data including at least one of an item weight, an item size, an item type, or an item number; determining a number of passengers based at least in part on the passenger data; and determining a number of vehicles associated with the transportation request, based at least in part on the item specification data and the number of passengers.

J. The method of paragraph F, further comprising: determining the first vehicle within a fleet of vehicles to transport the passenger, based at least in part on determining that the first vehicle includes a passenger compartment compatible with the passenger data; and determining the second vehicle within the fleet of vehicles to transport the item, based at least in part on determining that the second vehicle includes a storage compartment compatible with the item data.

K. The method of paragraph F, further comprising: determining a first route for the first vehicle based at least in part on the destination, including a first pick-up location and the first drop-off location; and determining a second route for the second vehicle based at least in part on the destination, including a second pick-up location and the second drop-off location, wherein the first drop-off location is the same as the second drop-off location, and wherein the first route is different from the second route.

L. The method of paragraph K, wherein the first route includes one or more driving segments and a first flying segment associated with a first flight; and wherein the second route includes one or more driving segments and a second flying segment associated with a second flight different from the first flight.

M. The method of paragraph K, further comprising: determining a first security classification associated with the passenger, wherein determining the first route is based at least in part on the first security classification; and determining a second security classification associated with the item, wherein determining the second route is based at least in part on the second security classification.

N. The method of paragraph K, wherein the first pick-up location and the second pick-up location are a same location.

O. One or more non transitory computer readable media storing instructions executable by a processor, wherein the instructions, when executed, cause the computing device to perform operations comprising: receiving a transportation request indicating a destination; determining passenger data based at least in part on the transportation request, wherein the passenger data indicates a passenger associated with the transportation request; determining item data based at least in part on the transportation request, wherein the item data indicates an item associated with the transportation request; causing a first instruction to be sent to a first vehicle to transport the passenger to a first drop-off location; and causing a second instruction to be sent to a second vehicle to transport the item to a second drop-off location.

P. The one or more non transitory computer readable media of paragraph O, wherein the passenger data includes a first pick-up time and the item data includes a second pick-up time different from the first pick-up time; wherein the first instruction comprises the first pick-up time, and a first identifier associated with the passenger; and wherein the second instruction comprises the second pick-up time, and a second identifier associated with the item.

Q. The one or more non transitory computer readable media of paragraph O, the operations further comprising: receiving a passenger pick-up time associated with the transportation request; determining, based at least in part on the passenger pick-up time, a first item itinerary including a first item pick-up time, and a second item itinerary including a second item pick-up time; determining a first cost associated with the first item itinerary; determining a second cost associated with the second item itinerary; transmitting, to a user device associated with the transportation request, the first item itinerary including the first item pick-up time and the first cost, and the second item itinerary including the second item pick-up time and the second cost; and receiving, from the user device, a selection of the first item itinerary or the second item itinerary.

R. The one or more non transitory computer readable media of paragraph O, the operations further comprising: determining item specification data associated with the item, the item specification data including at least one of an item weight, an item size, an item type, or an item number; determining a number of passengers based at least in part on the passenger data; and determining a number of vehicles associated with the transportation request, based at least in part on the item specification data and the number of passengers.

S. The one or more non transitory computer readable media of paragraph O, the operations further comprising: determining the first vehicle within a fleet of vehicles to transport the passenger, based at least in part on determining that the first vehicle includes a passenger compartment compatible with the passenger data; and determining the second vehicle within the fleet of vehicles to transport the item, based at least in part on determining that the second vehicle includes a storage compartment compatible with the item data.

T. The one or more non transitory computer readable media of paragraph O, the operations further comprising: determining a first route for the first vehicle based at least in part on the destination, including a first pick-up location and the first drop-off location; and determining a second route for the second vehicle based at least in part on the destination, including a second pick-up location and the second drop-off location, wherein the first drop-off location is the same as the second drop-off location, and wherein the first route is different from the second route.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

A non-limiting list of agents and other objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more computer-readable media storing computer-executable instructions that, when executed, cause the one or more processors to perform operations comprising:
   receiving a transportation request indicating a first pick-up location associated with one or more passengers, a second pick-up location associated with at least one item, and a destination location;
   determining passenger data based at least in part on the transportation request, wherein the passenger data indicates at least one passenger associated with the transportation request;
   determining item data associated with the transportation request, wherein the item data includes at least one of an item weight, an item size, an item type, or a number of items;
   determining that at least two vehicles are required to serve the transportation request based at least in part on the passenger data, the item data, and a size of one or more vehicles;
   determining a first vehicle within a fleet of vehicles to transport the at least one passenger, based at least in part on the passenger data;

determining a second vehicle within the fleet of vehicles to transport one or more items, based at least in part on the item data;

causing a first instruction to be sent to the first vehicle, the first instruction controlling the first vehicle to transport the at least one passenger from the first pick-up location to the destination location; and causing a second instruction to be sent to the second vehicle, the second instruction controlling the second vehicle to transport the one or more items from the second pick-up location to the destination location.

2. The system of claim 1, wherein the passenger data includes a first pick-up time and the item data includes a second pick-up time different from the first pick-up time;

wherein the first instruction comprises the first pick-up location, the first pick-up time, and a first identifier associated with the at least one passenger; and wherein the second instruction comprises the second pick-up location, the second pick-up time, and a second identifier associated with the one or more items.

3. The system of claim 1, the operations further comprising:

receiving a passenger pick-up time associated with the transportation request;

determining, based at least in part on the passenger pick-up time, a first item itinerary including a first item pick-up time, and a second item itinerary including a second item pick-up time;

determining a first cost associated with the first item itinerary;

determining a second cost associated with the second item itinerary;

transmitting, to a user device associated with the transportation request, the first item itinerary including the first item pick-up time and the first cost, and the second item itinerary including the second item pick-up time and the second cost; and receiving, from the user device, a selection of the first item itinerary or the second item itinerary.

4. The system of claim 1, wherein:

determining the first vehicle is based at least in part on determining that the first vehicle includes a passenger compartment compatible with the passenger data; and determining the second vehicle is based at least in part on determining that the second vehicle includes a storage compartment compatible with the item data.

5. The system of claim 1, the operations further comprising:

determining a first route for the first vehicle, including the first pick-up location and the destination location; and determining a second route for the second vehicle, including the second pick-up location and the destination location, wherein the second route is different from the first route.

6. A method comprising:

receiving, by a transportation system, a transportation request indicating a first drop-off location associated with a passenger and a second drop-off location associated with an item;

determining, by the transportation system and based at least in part on the transportation request, passenger data associated with the passenger;

determining, by the transportation system and based at least in part on the transportation request, item data associated with the item;

determining that at least two vehicles are required to serve the transportation request based at least in part on the passenger data and the item data;

causing, by the transportation system, a first instruction to be sent to a first vehicle, the first instruction controlling the first vehicle to transport the passenger to the first drop-off location; and causing, by the transportation system, a second instruction to be sent to a second vehicle, the second instruction controlling the second vehicle to transport the item to the second drop-off location.

7. The method of claim 6, wherein the passenger data includes a first pick-up time and the item data includes a second pick-up time different from the first pick-up time;

wherein the first instruction comprises the first pick-up time, and a first identifier associated with the passenger; and wherein the second instruction comprises the second pick-up time, and a second identifier associated with the item.

8. The method of claim 6, further comprising:

receiving a passenger pick-up time associated with the transportation request;

determining, based at least in part on the passenger pick-up time, a first item itinerary including a first item pick-up time, and a second item itinerary including a second item pick-up time;

determining a first cost associated with the first item itinerary;

determining a second cost associated with the second item itinerary;

transmitting, to a user device associated with the transportation request, the first item itinerary including the first item pick-up time and the first cost, and the second item itinerary including the second item pick-up time and the second cost; and receiving, from the user device, a selection of the first item itinerary or the second item itinerary.

9. The method of claim 6, further comprising:

determining item specification data associated with the item, the item specification data including at least one of an item weight, an item size, an item type, or an item number;

determining a number of passengers based at least in part on the passenger data; and determining a number of vehicles associated with the transportation request, based at least in part on the item specification data and the number of passengers.

10. The method of claim 6, further comprising:

determining the first vehicle within a fleet of vehicles to transport the passenger, based at least in part on determining that the first vehicle includes a passenger compartment compatible with the passenger data; and determining the second vehicle within the fleet of vehicles to transport the item, based at least in part on determining that the second vehicle includes a storage compartment compatible with the item data.

11. The method of claim 6, further comprising:

determining a first route for the first vehicle based at least in part on a first pick-up location and the first drop-off location; and determining a second route for the second vehicle based at least in part on a second pick-up location and the second drop-off location, wherein the first drop-off location is the same as the second drop-off location, and wherein the first route is different from the second route.

12. The method of claim 11, wherein the first route includes first one or more driving segments and a first flying segment associated with a first flight; and
wherein the second route includes second one or more driving segments and a second flying segment associated with a second flight different from the first flight.

13. The method of claim 11, further comprising:
determining a first security classification associated with the passenger, wherein determining the first route is based at least in part on the first security classification; and
determining a second security classification associated with the item, wherein determining the second route is based at least in part on the second security classification.

14. The method of claim 11, wherein the first pick-up location and the second pick-up location are a same location.

15. One or more non-transitory computer-readable media storing instructions executable by a processor, wherein the instructions, when executed, cause the processor to perform operations comprising:
receiving a transportation request indicating a first drop-off location associated with a passenger and a second drop-off location associated with an item;
determining passenger data associated with the passenger based at least in part on the transportation request;
determining item data associated with the item based at least in part on the transportation request;
determining that at least two vehicles are required to serve the transportation request based at least in part on the passenger data and the item data;
causing a first instruction to be sent to a first vehicle, the first instruction controlling the first vehicle to transport the passenger to the first drop-off location; and
causing a second instruction to be sent to a second vehicle, the second instruction controlling the second vehicle to transport the item to the second drop-off location.

16. The one or more non-transitory computer-readable media of claim 15, wherein the passenger data includes a first pick-up time and the item data includes a second pick-up time different from the first pick-up time;
wherein the first instruction comprises the first pick-up time, and a first identifier associated with the passenger; and
wherein the second instruction comprises the second pick-up time, and a second identifier associated with the item.

17. The one or more non-transitory computer-readable media of claim 15, the operations further comprising:
receiving a passenger pick-up time associated with the transportation request;
determining, based at least in part on the passenger pick-up time, a first item itinerary including a first item pick-up time, and a second item itinerary including a second item pick-up time;
determining a first cost associated with the first item itinerary;
determining a second cost associated with the second item itinerary;
transmitting, to a user device associated with the transportation request, the first item itinerary including the first item pick-up time and the first cost, and the second item itinerary including the second item pick-up time and the second cost; and
receiving, from the user device, a selection of the first item itinerary or the second item itinerary.

18. The one or more non-transitory computer-readable media of claim 15, the operations further comprising:
determining item specification data associated with the item, the item specification data including at least one of an item weight, an item size, an item type, or an item number;
determining a number of passengers based at least in part on the passenger data; and
determining a number of vehicles associated with the transportation request, based at least in part on the item specification data and the number of passengers.

19. The one or more non-transitory computer-readable media of claim 15, the operations further comprising:
determining the first vehicle within a fleet of vehicles to transport the passenger, based at least in part on determining that the first vehicle includes a passenger compartment compatible with the passenger data; and
determining the second vehicle within the fleet of vehicles to transport the item, based at least in part on determining that the second vehicle includes a storage compartment compatible with the item data.

20. The one or more non-transitory computer-readable media of claim 15, the operations further comprising:
determining a first route for the first vehicle based at least in part on a first pick-up location and the first drop-off location; and
determining a second route for the second vehicle based at least in part on a second pick-up location and the second drop-off location, wherein the first drop-off location is the same as the second drop-off location, and wherein the first route is different from the second route.

* * * * *